United States Patent
Wang et al.

(10) Patent No.: US 8,547,430 B2
(45) Date of Patent: Oct. 1, 2013

(54) SYSTEM AND METHOD FOR MARKING DISCREPANCIES IN IMAGE OF OBJECT

(75) Inventors: Guang-Jian Wang, Shenzhen (CN);
Dai-Gang Zhang, Shenzhen (CN);
Jin-Rong Zhao, Shenzhen (CN);
Xiao-Mei Liu, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 300 days.

(21) Appl. No.: 13/183,449

(22) Filed: Jul. 15, 2011

(65) Prior Publication Data
US 2012/0140084 A1 Jun. 7, 2012

(30) Foreign Application Priority Data
Dec. 4, 2010 (CN) .......................... 2010 1 0573285

(51) Int. Cl.
*H04N 7/18* (2006.01)
*G06K 9/00* (2006.01)

(52) U.S. Cl.
USPC .............................. 348/92; 382/145; 382/165

(58) Field of Classification Search
None
See application file for complete search history.

(56) References Cited

U.S. PATENT DOCUMENTS
2007/0177787 A1* 8/2007 Maeda et al. ................. 382/141

* cited by examiner

*Primary Examiner* — David Czekaj
*Assistant Examiner* — Mohammad J Rahman
(74) *Attorney, Agent, or Firm* — Altis & Wispro Law Group, Inc.

(57) ABSTRACT

In a method for marking discrepancies of a captured image of an object, an image is captured and compared to a standard image. A discrepant image showing any discrepancies of the captured image is generated, and is separated into an R grayscale image, a G grayscale image, and a B grayscale image. An R channel matrix group, a G channel matrix group, and a B channel matrix group are created. R channel negative matrixes, G channel negative matrixes, and B channel negative matrixes are determined from the RGB channel matrix groups. RGB pixel groups are calculated based on the R channel negative matrixes, the G channel negative matrixes, and the B channel negative matrixes. A target pixel group to be marked is determined by calculating an intersection of the RGB pixel groups. The discrepancies of the digital image are marked out according to the target pixel group.

15 Claims, 3 Drawing Sheets

SYSTEM AND METHOD FOR MARKING DISCREPANCIES IN IMAGE OF OBJECT

BACKGROUND

1. Technical Field

Embodiments of the present disclosure relate to image processing technologies, and particularly to a system and method for marking discrepancies between two images.

2. Description of Related Art

Automatic optical inspection (AOI) devices are widely used to automatically inspect a captured image of an object which is being tested, such as a motherboard or a printed circuit board (PCB), to find discrepancies between the captured image and a standard image of the object. In general, an iteration method is usually used to inspect any discrepancies by analyzing each pixel of the two images, which is time consuming and costly.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
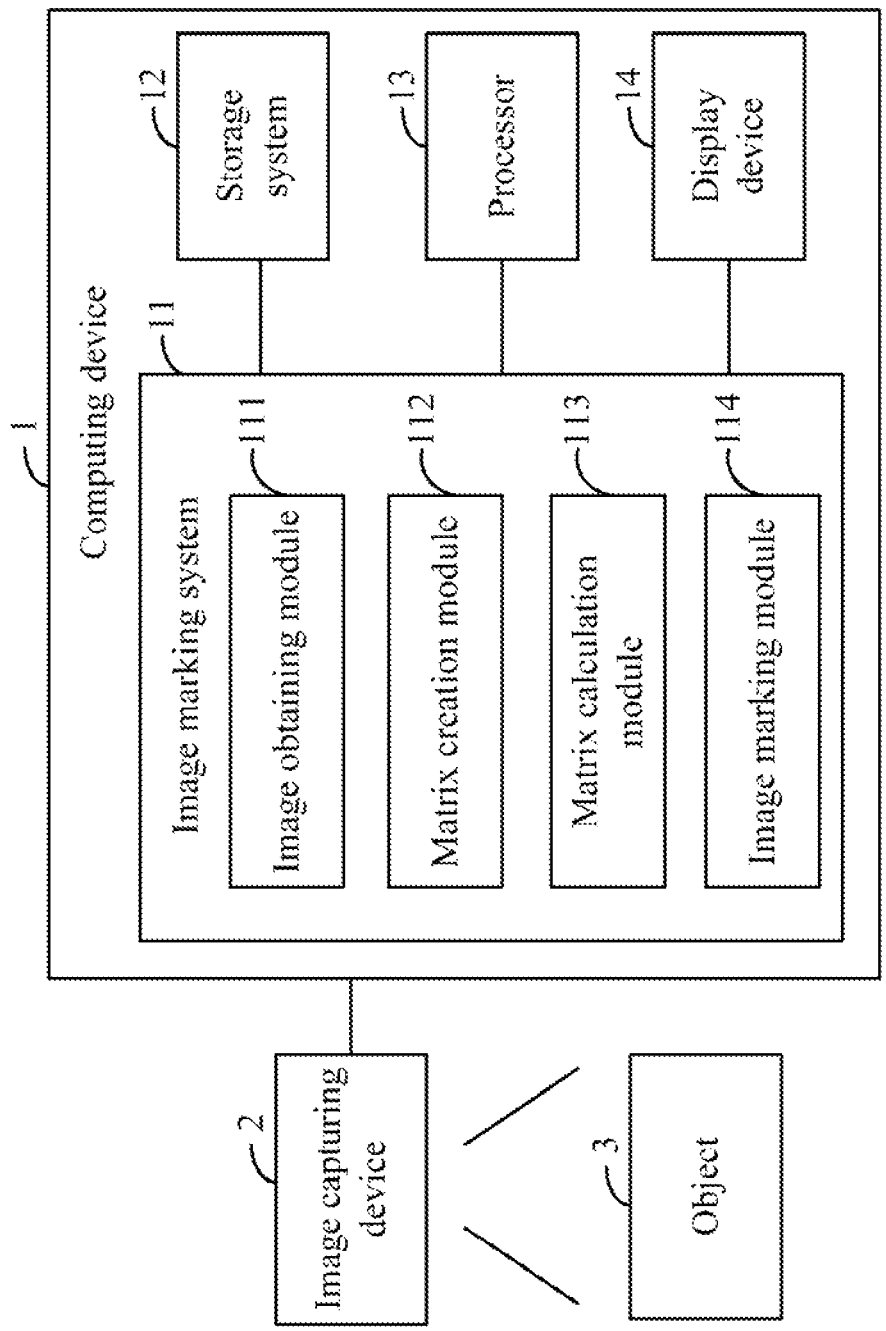
FIG. 1 is a block diagram of one embodiment of a computing device including an image marking system.
Figure 2:
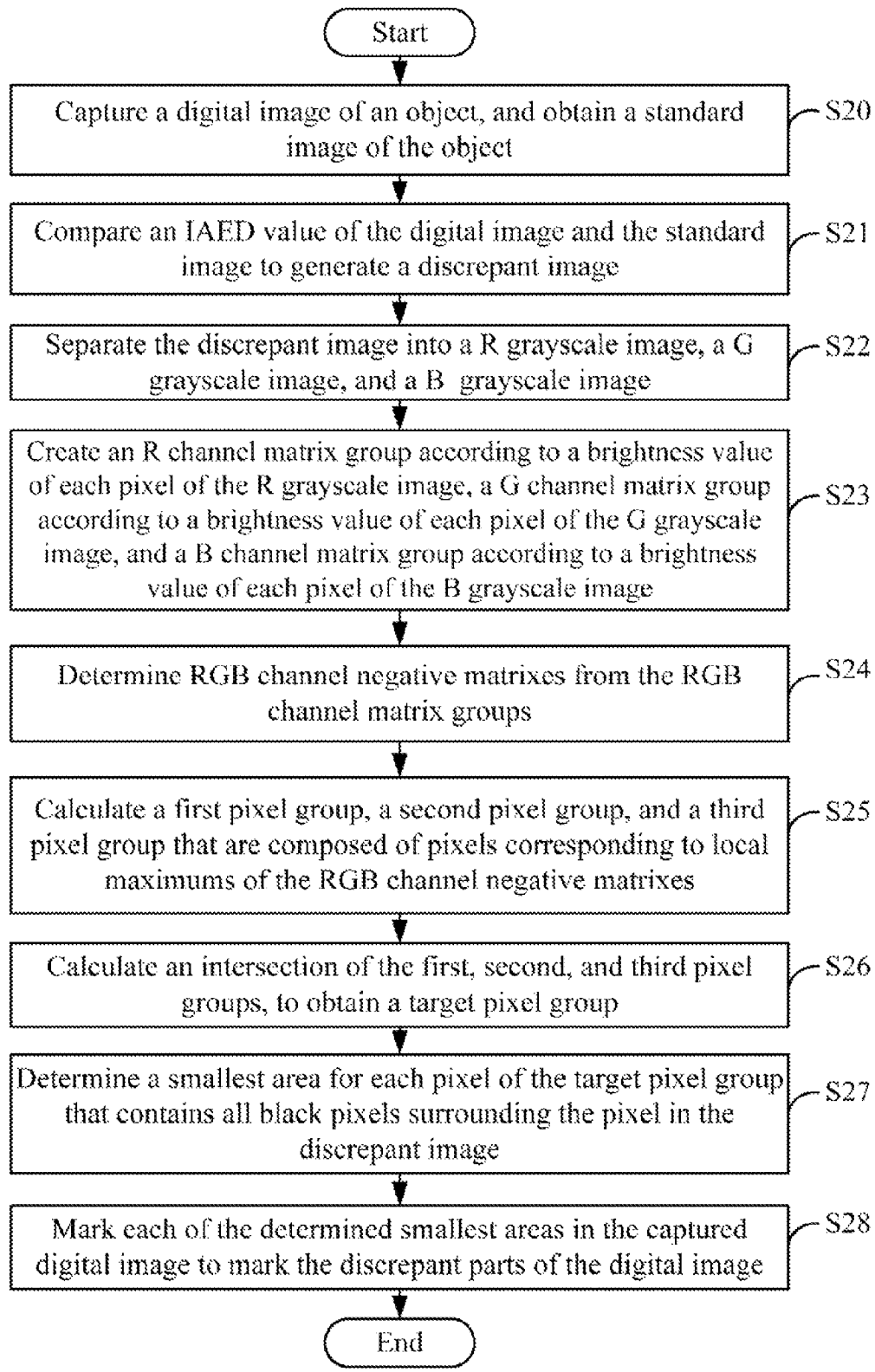
FIG. 2 is a flowchart of one embodiment of a method for marking discrepancies of an image of an object using the system of FIG. 1.
Figure 3:
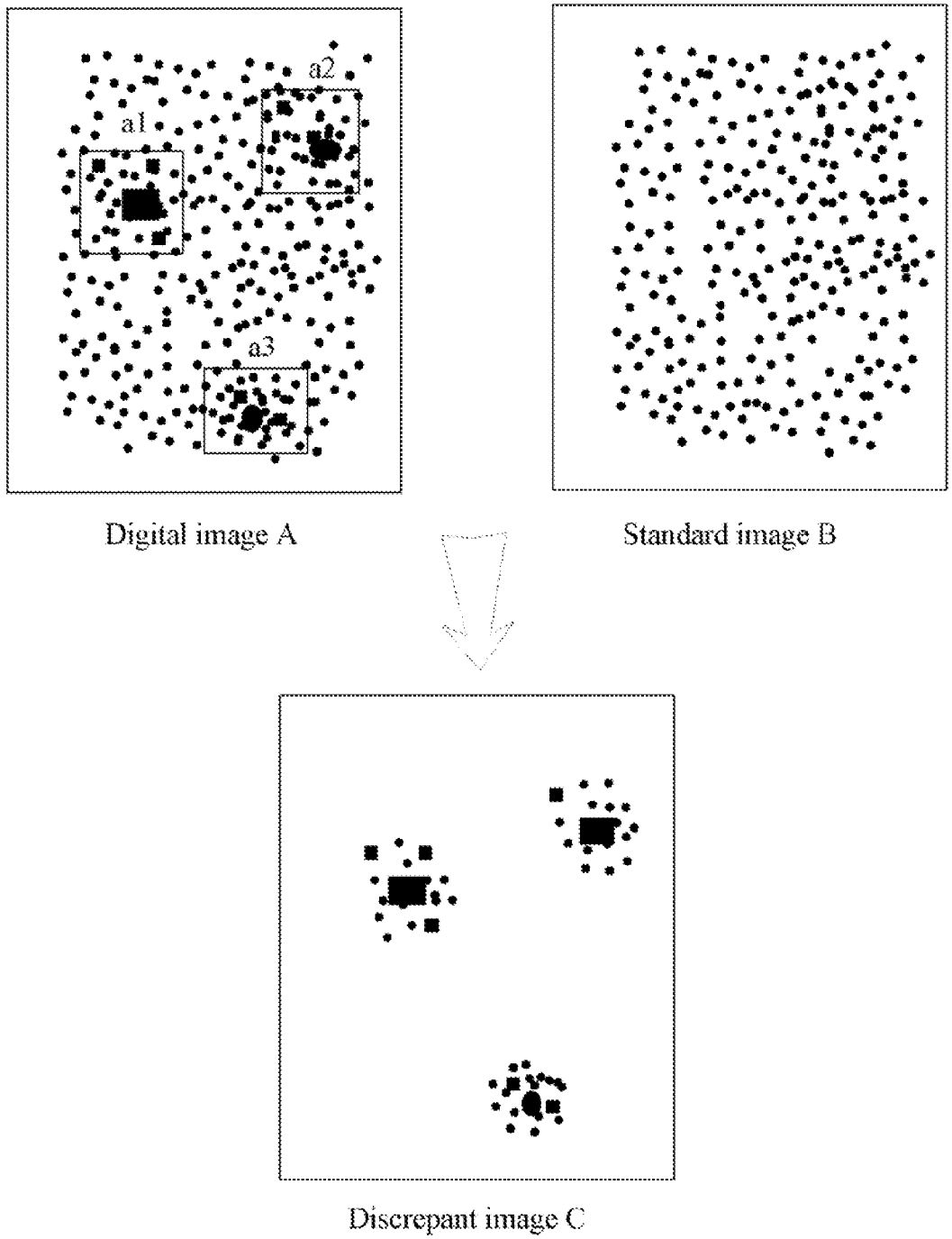
FIG. 3 is a schematic diagram illustrating one example of a digital image and a standard image of the object.

FIG. 1 is a block diagram of one embodiment of a computing device 1 including an image marking system 11. In the embodiment, the computing device 1 connects to an image capturing device 2 such as a digital camera. The image capturing device 2 is configured to capture a digital image (as shown in FIG. 3) of an object 3, such as a motherboard of a computer. The computing device 1 may further include a storage system 12, at least one processor 13, and a display device 14. The image marking system 11 can analyze the digital image and a standard image of the object 3 to find any parts of the two images which are not substantially identical (discrepant parts), and is able to mark out and distinguish the discrepant parts in the digital image, even when the digital image is influenced by a reflection of surrounding light or by differences in the levels of the surrounding light.

The storage system 12 stores a prototypical image or a standard image (herein after referred as to "standard image") of the object 3, as shown in FIG. 3, and one or more programs of the image marking system 11. The standard image is a reference image of the object 3. In one embodiment, the storage system 12 may be an internal storage system, such as a random access memory (RAM) for temporary storage of information, and/or a read only memory (ROM) for the permanent storage of information. In some embodiments, the storage system 12 may also be an external storage system, such as an external hard disk, a storage card, or a data storage medium.

In one embodiment, the image marking system 11 includes an image obtaining module 111, a matrix creation module 112, a matrix calculation module 113, and an image marking module 114. The modules 111-114 may comprise computerized instructions in the form of one or more programs that are stored in the storage system 12, and executed by the at least one processor 13 to provide functions for marking the discrepant parts of the digital image, and displaying the marked digital image on the display device 14.

In general, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

The image obtaining module 111 is operable to capture a digital image of the object 3 using the image capturing device 2, and to obtain the standard image of the object 3 from the storage system 12. As shown in FIG. 3, the digital image may be different from the standard image, since the digital image captured from the object 3 may have been influenced by reflections from the surrounding light or by differences in the levels of the surrounding light.

The image obtaining module 111 is further operable to compare an image average energy density (IAED) value of the digital image and an IAED value of the standard image to generate an image of discrepancies found to exist between the captured digital image and the standard image (herein after "discrepant image"), and separate the discrepant image into an R (red) grayscale image, a G (green) grayscale image, and a B (blue) grayscale image based on the RGB channels of the discrepant image. In one embodiment, the discrepant image includes discrepant parts found between the digital image and the standard image. The RGB channels include an R channel, a G channel, and a B channel of the discrepant image. The RGB values of each pixel are described using brightness values of the R, G, and B channels of each pixel. The IAED is defined as an image energy density of each pixel of the image having N*N pixels, and is calculated according to the equation IAED=(R+G+B)/N/N, where R represents a pixel value of the R channel, G represents a pixel value of the G channel, and B represents a pixel value of the B channel. The pixel value of the R channel, the G channel, or the B channel may be an integer in the range of 0 to 255.

The matrix creation module 112 is operable to create an R channel matrix group according to a brightness value of each pixel of the R grayscale image, create a G channel matrix group according to a brightness value of each pixel of the G grayscale image, and create a B channel matrix group according to a brightness value of each pixel of the B grayscale image. The R channel matrix group includes a plurality of R channel matrixes, wherein the number of the R channel matrixes is equal to the number of the pixels of the R grayscale image. The G channel matrix group includes a plurality of R channel matrixes, wherein the number of the R channel matrixes is equal to the number of the pixels of the G grayscale image. The B channel matrix group includes a plurality of R channel matrixes, wherein the number of the B channel matrixes is equal to the number of the pixels of the R grayscale image. In one embodiment, the R channel matrix, the G channel matrix, and the B channel matrix may be created using a hessian matrix. Each of the R channel matrix group, the G channel matrix group, and the B channel matrix group includes positive definite matrixes and negative definite matrixes. Each of the positive definite matrixes or negative definite matrixes may be described as a second-order partial derivatives matrix.

The matrix creation module 112 is further operable to determine R channel negative matrixes from the R channel matrix group, G channel negative matrixes from the G channel matrix group, and B channel negative matrixes from the B channel matrix group. In one embodiment, if the brightness value of a pixel (X, Y) is E(X, Y), the matrix creation module 112 determines the negative matrixes by comparing the brightness values of the pixels surrounding the pixel (X, Y). If E(Xn−1, Ym)<E(Xn, Ym), E(Xn, Ym)>E(Xn+1, Ym), E(Xn, Ym−1)<E(Xn, Ym), and E(Xn, Ym)>E(Xn, Ym+1), the created matrixes including the brightness values of the pixel (X, Y) and the pixels surrounding the pixel (X, Y) are determined as negative matrixes.

The matrix calculation module 113 is operable to calculate a first pixel group {R(X1,Y1), R(X2,Y2), ... R(Xp,Yp)} that is composed of p pixels corresponding to local maximums of the R channel negative matrixes, a second pixel group {G(M1, N1), G(M2, N2), ... G(Mq, Nq)} that is composed of q pixels corresponding to local maximums of the G channel negative matrixes, and a third pixel group {B(T1, S1), B(T2, S2), ... B(Tr, Sr)} that is composed of r pixels corresponding to local maximums of the B channel negative matrixes. In the embodiment, the matrix calculation module 113 may determine the local maximums of the R, G, and B channel negative matrixes by calculating a second-order partial derivatives of each negative matrix of the R, G, and B channel negative matrixes. The pixels corresponding to the local maximums of the R, G, and B channel negative matrixes are respectively composed of the first pixel group, the second pixel group, and the third pixel group.

The matrix calculation module 113 is further operable to calculate an intersection of the first, second, and third pixel groups, to obtain a target pixel group {(X1, Y1), (X2, Y2), ... (Xj, Yj)} which requires to be marked. In one embodiment, if Xp=Mq=Tr, and Yp=Nq=Sr, the pixels R(Xp, Yp), G(Mq, Nq), and B(Tr, Sr) are determined to be the same pixel, that is to say one pixel of the target pixel group (Xj,Yj).

The image marking module 114 is operable to determine a smallest area for each pixel (Xj, Yj) of the target pixel group that contains all black pixels surrounding the pixel (Xj, Yj) in the discrepant image. In the embodiment, if the brightness value of a pixel is 0, the pixel is defined as a black pixel. If the distance between a black pixel and the pixel (Xj, Yj) is less than the distance between the black pixel and any other pixel of the target group, the black pixel is defined to be a black pixel surrounding the pixel (Xj, Yj).

The image marking module 114 is further operable to mark each of the determined smallest areas in the captured digital image of the object 3, to isolate and mark the discrepant parts of the digital image. As shown in FIG. 3, the marked areas are a1, a2, and a3 in the digital image A of the object 3. In one embodiment, the smallest area may be a rectangle or a circle centered on the pixel (Xj, Yj).

FIG. 3 is a one embodiment of a method for marking discrepancies of an image of an object using the system of FIG. 1. In the embodiment, the method analyzes a captured digital image against a standard image of the object 3 to find discrepancies between the two images, and marks the discrepancies in the digital image, when the digital image may have been subject to reflections in the surrounding light or to differences in levels of the surrounding light when the digital image is captured by the image capturing device 2. Depending on the embodiment, additional blocks may be added, others removed, and the ordering of the blocks may be changed.

In block S20, the image obtaining module 111 captures a digital image of the object 3 using the image capturing device 2, and obtains a standard image of the object 3 from the storage system 12. As shown in FIG. 3, the digital image may display differences compared to the standard image. The digital image captured from the object 3 may have been affected by reflections from the surrounding light or by differences in the level of the surrounding light. The standard image is defined as a reference image of the object 3 which has been captured without any anomalies in or from the surrounding light.

In block S21, the image obtaining module 111 compares an IAED value of the digital image and an IAED value of the standard image to generate a discrepant image from the digital image and the standard image. For example, image C in FIG. 3 is an example of a discrepant image.

In block S22, the image obtaining module 11 separates the discrepant image into an R grayscale image, a G grayscale image, and a B grayscale image based on the RGB channels of the discrepant image. In the embodiment, the RGB channels include an R channel, a G channel, and a B channel of the discrepant image. The RGB values of each pixel of the discrepant image are described using the brightness values of the R, G, and B channels of each pixel.

In block S23, the matrix creation module 112 creates an R channel matrix group according to the brightness value of each pixel of the R grayscale image, creates a G channel matrix group according to the brightness value of each pixel of the G grayscale image, and creates a B channel matrix group according to the brightness value of each pixel of the B grayscale image. Details of the R channel matrix group, the G channel matrix, and the B channel matrix are described above.

In block S24, the matrix creation module 112 determines the R channel negative matrixes from the R channel matrix group, the G channel negative matrixes from the G channel matrix group, and the B channel negative matrixes from the B channel matrix group. In one embodiment, each of the R channel matrix group, the G channel matrix group, and the B channel matrix group includes one or more positive definite matrixes and one or more negative definite matrixes. Each of the definite matrixes or negative definite matrixes may be described as a second-order partial derivatives matrix.

In block S25, the matrix calculation module 113 calculates a first pixel group {R(X1,Y1), R(X2,Y2), ... R(Xp,Yp)} that is composed of p pixels corresponding to the local maximums of the R channel negative matrixes, a second pixel group {G(M1, N1), G(M2, N2), ... G(Mq, Nq)} composed of q pixels corresponding to the local maximums of the G channel negative matrixes, and a third pixel group {B(T1, S1), B(T2, S2), ... B(Tr, Sr)} composed of r pixels corresponding to the local maximums of the B channel negative matrixes. In the embodiment, the matrix calculation module 113 may determine the local maximums of the R, G, and B channel negative matrixes by calculating the second-order partial derivatives of each negative matrix of the R, G, and B channel negative matrixes. The pixels corresponding to the local maximums of the R, G, and B channel negative matrixes are respectively composed of the first, second, and third pixel groups.

In block S26, the matrix calculation module 113 calculates an intersection of the first, second, and third pixel groups, to obtain a target pixel group {(X1,Y1), (X2,Y2), ... (Xj, Yj)}. In one embodiment, if Xp=Mq=Tr, and Yp=Nq=Sr, the pixels R(Xp,Yp), G(Mq, Nq), and B(Tr, Sr) are determined to be the same pixel, that is to say one pixel of the target pixel group (Xj, Yj).

In block S27, the image marking module 114 determines a smallest area for each pixel (Xj, Yj) of the target pixel group that contains all the black pixels surrounding the pixel (Xj,Yj) in the discrepant image. In the embodiment, if the brightness value of a pixel is 0, the pixel is defined as a black pixel. If the distance between that black pixel and the pixel (Xj,Yj) is less than the distance between that black pixel and any other pixel of the target group, that black pixel is defined to be a black pixel surrounding the pixel (Xj, Yj).

In block S28, the image marking module 114 marks each of the determined smallest areas in the captured digital image of the object 3, to mark out the discrepant parts of the digital image. As shown in FIG. 3, the marked areas are a1, a2, and a3 in the digital image A of the object 3. In one embodiment, the smallest area may be a rectangle or a circle centered on the pixel (Xj, Yj).

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, the computing device being connected to an image capturing device, the computing device comprising:

a storage system;

at least one processor; and one or more programs stored in the storage system and executable by the at least one processor, the one or more programs comprising:

an image obtaining module operable to capture a digital image of an object using the image capturing device, obtain a standard image of the object from the storage system, compare an image average energy density (IAED) value of the digital image and an IAED value of the standard image to generate a discrepant image from the digital image and the standard image, and separate the discrepant image into an R (red) grayscale image, a G (green) grayscale image, and a B (blue) grayscale image based on RGB channels of the discrepant image;

a matrix creation module operable to create an R channel matrix group according to a brightness value of each pixel of the R grayscale image, create a G channel matrix group according to a brightness value of each pixel of the G grayscale image, create a B channel matrix group according to a brightness value of each pixel of the B grayscale image, and determine R channel negative matrixes from the R channel matrix group, G channel negative matrixes from the G channel matrix group, and B channel negative matrixes from the B channel matrix group;

a matrix calculation module operable to calculate a first pixel group that is composed of pixels corresponding to local maximums of the R channel negative matrixes, a second pixel group that is composed of pixels corresponding to local maximums of the G channel negative matrixes, and a third pixel group that is composed of pixels corresponding to local maximums of the B channel negative matrixes, and obtain a target pixel group by calculating an intersection of the first, second, and third pixel groups; and an image marking module operable to determine a smallest area for each pixel of the target pixel group that contains all black pixels surrounding the pixel in the discrepant image, and mark each of the determined smallest areas in the captured digital image of the object to mark out discrepant parts of the digital image.

2. The computing device according to claim 1, wherein the IAED value is defined as an image energy density of each pixel of an image having N*N pixels, and is calculated according to a calculation equation IAED=(R+G+B)/N/N, wherein R represents a pixel value of an R channel, G represents a pixel value of a G channel, and B represents a pixel value of a B channel.

3. The computing device according to claim 1, wherein each of the R channel matrix group, the G channel matrix group, and the B channel matrix group includes one or more positive definite matrixes and one or more negative definite matrixes.

4. The computing device according to claim 3, wherein each of the definite matrixes and the negative definite matrixes is described as a second-order partial derivatives matrix.

5. The computing device according to claim 4, wherein the local maximums of the R channel negative matrixes, the G channel negative matrixes, and the B channel negative matrixes are determined by calculating a second-order partial derivatives of each negative matrix of the R channel negative matrixes, the G channel negative matrixes, and the B channel negative matrixes.

6. A computerized method for marking discrepancies of a captured image of an object using a computing device, the method comprising:

capturing a digital image of the object using an image capturing device, and obtaining a standard image of the object from a storage system of the computing device;

comparing an image average energy density (IAED) value of the digital image and an IAED value of the standard image to generate a discrepant image from the digital image and the standard image;

separating the discrepant image into an R (red) grayscale image, a G (green) grayscale image, and a B (blue) grayscale image based on RGB channels of the discrepant image;

creating an R channel matrix group according to a brightness value of each pixel of the R grayscale image, creating a G channel matrix group according to a brightness value of each pixel of the G grayscale image, and creating a B channel matrix group according to a brightness value of each pixel of the B grayscale image;

determining R channel negative matrixes from the R channel matrix group, G channel negative matrixes from the G channel matrix group, and B channel negative matrixes from the B channel matrix group;

calculating a first pixel group that is composed of pixels corresponding to local maximums of the R channel negative matrixes, a second pixel group that is composed of pixels corresponding to local maximums of the G channel negative matrixes, and a third pixel group that is composed of pixels corresponding to local maximums of the B channel negative matrixes;

obtaining a target pixel group by calculating an intersection of the first, second, and third pixel groups;

determining a smallest area for each pixel of the target pixel group that contains all black pixels surrounding the pixel in the discrepant image; and marking each of the determined smallest areas in the captured digital image of the object to mark out the discrepant parts of the digital image.

7. The method according to claim 6, wherein the IAED value is defined as an image energy density of each pixel of an image having N*N pixels, and is calculated according to a calculation equation IAED=(R+G+B)/N/N, wherein R represents a pixel value of an R channel, G represents a pixel value of a G channel, and B represents a pixel value of a B channel.

8. The method according to claim 6, wherein each of the R channel matrix group, the G channel matrix group, and the B channel matrix group includes one or more positive definite matrixes and one or more negative definite matrixes.

9. The method according to claim 8, wherein each of the definite matrixes and the negative definite matrixes is described as a second-order partial derivatives matrix.

10. The method according to claim 9, wherein the local maximums of the R channel negative matrixes, the G channel negative matrixes, and the B channel negative matrixes are determined by calculating a second-order partial derivatives of each negative matrix of the R channel negative matrixes, the G channel negative matrixes, and the B channel negative matrixes.

11. A non-transitory computer-readable medium having stored thereon instructions that, when executed by at least one processor of a computing device, causes a method for marking discrepant parts of a captured image of an object using a computing device, the method comprising:

capturing a digital image of the object using an image capturing device, and obtaining a standard image of the object from a storage system of the computing device;

comparing an image average energy density (IAED) value of the digital image and an IAED value of the standard image to generate a discrepant image from the digital image and the standard image;

separating the discrepant image into an R (red) grayscale image, a G (green) grayscale image, and a B (blue) grayscale image based on RGB channels of the discrepant image;

creating an R channel matrix group according to a brightness value of each pixel of the R grayscale image, creating a G channel matrix group according to a brightness value of each pixel of the G grayscale image, and creating a B channel matrix group according to a brightness value of each pixel of the B grayscale image;

determining R channel negative matrixes from the R channel matrix group, G channel negative matrixes from the G channel matrix group, and B channel negative matrixes from the B channel matrix group;

calculating a first pixel group that is composed of pixels corresponding to local maximums of the R channel negative matrixes, a second pixel group that is composed of pixels corresponding to local maximums of the G channel negative matrixes, and a third pixel group that is composed of pixels corresponding to local maximums of the B channel negative matrixes;

obtaining a target pixel group by calculating an intersection of the first, second, and third pixel groups;

determining a smallest area for each pixel of the target pixel group that contains all black pixels surrounding the pixel in the discrepant image; and marking each of the determined smallest areas in the captured digital image of the object to mark out the discrepant parts of the digital image.

12. The non-transitory computer-readable medium according to claim 11, wherein the IAED value is defined as an image energy density of each pixel of an image having N*N pixels, and is calculated according to a calculation equation IAED=(R+G+B)/N/N, wherein R represents a pixel value of an R channel, G represents a pixel value of a G channel, and B represents a pixel value of a B channel.

13. The non-transitory computer-readable medium according to claim 11, wherein each of the R channel matrix group, the G channel matrix group, and the B channel matrix group includes one or more positive definite matrixes and one or more negative definite matrixes.

14. The non-transitory computer-readable medium according to claim 13, wherein each of the definite matrixes and the negative definite matrixes is described as a second-order partial derivatives matrix.

15. The non-transitory computer-readable medium according to claim 14, wherein the local maximums of the R channel negative matrixes, the G channel negative matrixes, and the B channel negative matrixes are determined by calculating a second-order partial derivatives of each negative matrix of the R channel negative matrixes, the G channel negative matrixes, and the B channel negative matrixes.

* * * * *